Figure 1:
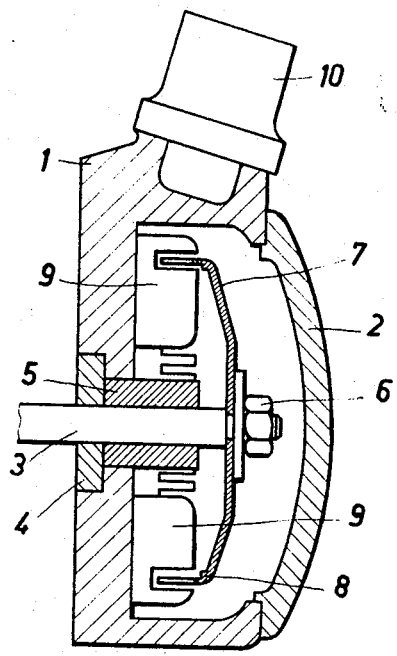

United States Patent

[11] 3,594,742

| [72] | Inventors | Jean-Pierre Reichenbach<br>Koniz;<br>Erhard Winkler, Berne, both of,<br>Switzerland |
|---|---|---|
| [21] | Appl. No. | 772,619 |
| [22] | Filed | Nov. 1, 1968 |
| [45] | Patented | July 20, 1971 |
| [73] | Assignee | Hasler AG<br>Berne, Switzerland |
| [32] | Priority | Nov. 7, 1967 |
| [33] | | Switzerland |
| [31] | | 15464/67 |

[54] ANGLE STEPPING TRANSMITTERS
2 Claims, 4 Drawing Figs.

[52] U.S. Cl. .................................................. 340/196,
310/268, 340/258, 340/271
[51] Int. Cl. ......................................................G08c 21/00
[50] Field of Search........................................ 340/196,
271, 319, 358, 282; 331/65; 324/70; 310/168, 169,
170

[56] References Cited
UNITED STATES PATENTS

| 2,325,927 | 8/1943 | Wilbur.......................... | 175/183 |
| 3,148,325 | 9/1964 | Burk, Jr........................ | 323/51 |
| 3,209,341 | 9/1965 | Lide............................. | 340/196 |
| 3,372,293 | 3/1968 | Henry-Baudot................ | 310/268 |
| 3,455,162 | 7/1969 | Michener et al................ | 73/231 |

FOREIGN PATENTS

| 1,234,074 | 2/1967 | Germany...................... | 324/173 |

Primary Examiner—John W. Caldwell
Assistant Examiner—Michael J. Bobbitt
Attorney—Brady, O'Boyle and Gates ABSTRACT: An angle stepping transmitter for generating electric signals in dependence on the angular position of a shaft comprises two coils connected in the feedback circuit of a high frequency transmitter with an electrically conductive toothed member on the shaft having teeth which travel between the coils, two members of electrical insulation material on which the coils are wound being disposed in openings in the arms of a U-shaped holder.

PATENTED JUL20 1971 3,594,742

Inventors
JEAN-PIERRE REICHENBACH
ERHARD WINKLER
BY Brady, O'Boyle & Gates
ATTORNEYS

ANGLE STEPPING TRANSMITTERS

The invention relates to an angle stepping transmitter for producing electrical signals relative to the angular position of a shaft. Apparatus of the kind heretofore described are widely employed, in particular for the remote measurement of rotational velocities. The inductive measuring transducers most frequently employed become unusable if it is desired to perform measurements at very low speeds, because the output voltage is proportional to the speed. Numerous principles have been employed in order to provide a constant signal amplitude, even at very low speeds, for example optical systems which are however unusable owing to the fragility of the incandescent filament if the system is exposed to frequent and hard mechanical shock, for example in railway operation. The prior art also discloses systems which employ ferromagnetic toothed wheels, whose teeth alter the flux in magnetic circuits, an effect measured either by detuning of an oscillating circuit or by means of flux gates or by means of Hall probes. With all these methods the measuring head can supply only a small voltage so that a high degree of amplification is required, a feature which renders the aforementioned methods troubleprone.

The prior art also discloses measuring transmitters employed for remote measuring systems and having a high frequency generator, provided with feedback via two coils and having a toothed part, mounted on the shaft and comprising electrically conducting material, the aforementioned teeth traversing between the aforementioned coils when the shaft is rotated and thus cause the high frequency generator oscillations to cease. The advantage of this system is that large and clearly defined signals are produced at the measuring head but the known arrangements hitherto had properties which are detrimental for many applications: a coarse tooth pitch, resulting in a small ratio of pulse frequency to angular velocity and preventing finely graded changing of said ratio. The toothed part of known embodiments was constructed as a disc and fixedly joined to the shaft so that it was not readily possible to effect an exchange with a part having a different tooth pitch. However, these two properties are desirable for tachogenerators if the pulse frequency is to be presented merely as a function of the vehicle speed, the angular velocity of the vehicle wheel and therefore of the toothed part being however also a function of the wheel diameter. Variation in the number of teeth in this case permits easy adaptation to the wheel diameter. In order to perform sufficiently accurate adaptation it is necessary for the number of teeth to be sufficiently large, e.g., the smallest number of teeth used for the smallest wheel diameter must be at least 50 for an absolute matching discrepancy of 1 percent.

An angle stepping transmitter must further be required to provide a high degree of reliability over a wide range of temperatures, imperviousness to heavy mechanical shocks and simple setting of the coil position during manufacture.

Satisfying the demand for a small tooth pitch and simple as well as reliable coil setting depends in particular on the geometrical layout of the coils and their adjustment. The system according to the invention is characterized in that the two coils are wound on two rotational members of insulating material having cylindrical extensions which are disposed in coaxial bores in one member each of a U-shaped holder, the aforementioned toothed part being movable between said members.

The demand for a high degree of reliability of the system is satisfied in that the aforementioned U-shaped block is mounted on a printed circuit panel which supports the high frequency generator circuit, constructed as a transistorized circuit and that coils and circuit are encapsulated into a block which contains a slot in which the toothed part is adapted to move.

Figure 2:
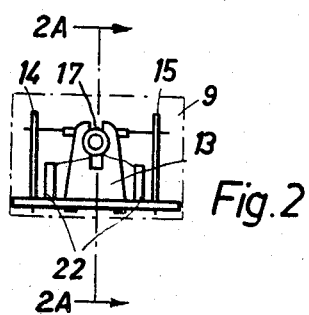
Figure 2A:
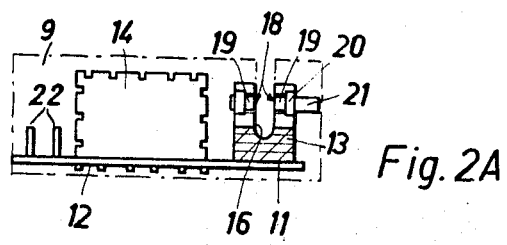
Figure 3:
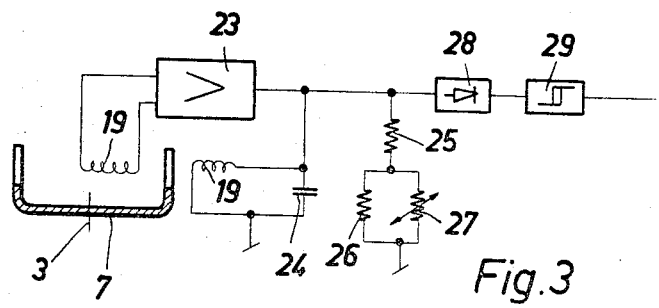

An exemplified embodiment of the angle stepping transmitter is explained hereinbelow by reference to the illustrations in which:

FIG. 1 is a cross-sectional view showing the mechanical layout of the angle stepping transmitter, constructed as tachogenerator for railways, FIG. 2 is an end elevational view showing the coil retaining means and the mechanical construction of the electrical circuit, FIG. 2A is a longitudinal sectional view taken substantially on line 2A–2A of FIG. 2; and FIG. 3 is a schematic block diagram of the aforementioned circuit.

In FIG. 1, the numeral 1 refers to a housing which is closed by the tightly closing cover 2. The shaft 3, to which, for example the velocity of a railway wheel is imparted by means of a driver which is not shown, extends through the housing wall. The numerals 4 and 5 show in diagrammatic form a shaft seal or shaft bearing. An aluminum bell 7 is easily exchangeably mounted by means of the nut 6 on the shaft 3, said bell being provided on its cylindrical part 8 alternately with teeth and gaps, said teeth and gaps being approximately of the same width. The thickness of the teeth is determined substantially by the centrifugal stresses applied thereto. The teeth engage in the slot of one or two or three blocks 9 which contain the electronic circuit. The numeral 10 finally refers to plug means mounted on the housing for supplying the operating voltage and for conducting the generated pulses. The earlier mentioned demand for easy interchangeability of the toothed wheel is satisfied in the aforementioned manner. Moreover, the bell shape of the toothed part offers the advantage of rendering ineffective any displacements of the shaft in the axial direction, provided the teeth are sufficiently long.

The driver which imparts the angular velocity to the shaft 3 may be either of the mechanical or of the magnetic type. In the last-mentioned case it is possible for the magnetic driver to be effective in known manner through a separating wall of the housing, and in this case the seal 4 may be omitted and the shaft 3 as well as the bearing 5 may be constructed in a lighter manner.

The mechanical construction of the coil retaining means and of the electronic circuit is illustrated in FIG. 2. The numeral 11 refers to a baseplate having on its underside 12 a printed circuit, on its upper side the U-shaped coil support 13 and further printed circuit boards 14 and 15. The coil support comprises a block slotted in cruciform manner. One slot is so dimensioned as to enable the cylindrical part 8 of the bell 7 to rotate freely therein. To this end the inner side 16 of the aforementioned slot is adapted to the internal shape of the bell. In parallel to the other slot 17 each member is provided with a bore 18 for accommodating the coils 19. The coils are wound on a pin member of insulating material having a cylindrical part 20 which fits precisely into a corresponding bore of the U-shaped block. All bores are coaxial. It has been found that adjustability of the coil spacing must be provided in order to set up the feedback conditions but that the optimum position is obtained with the coils being coaxial. The illustrated arrangement permits sliding of the coils in the axial direction and only in said direction. The insulating material member 20 is provided with a cylindrical extension 21 which serves as a handle for adjustment purposes. After the correct position of the coils has been found, said coils are fixed in position by means of an adhesive and the handle 21 may be cut off. The slot 17 in which the axis of bores 18 is disposed also serves for bringing out the coil connections which are secured to four solder lugs 22.

The elements of the electronic circuit are mounted on the printed circuit boards 14 and 15. Said boards are provided with edge notches into which the leads of the capacitors and resistors are inserted. The surfaces of the aforementioned boards are provided with printed circuits for connecting the aforementioned elements. After adjustment of the coil spacing and testing of the circuit, said circuit is encapsulated with insulating compound to form a compact block 9 in which only the slot for traversing the teeth of the bell is recessed.

FIG. 3 is an electrical schematic block diagram of the electronic circuit. The numeral 7 refers to the toothed bell adapted to rotate around the shaft 3. On both sides of the toothed wheel are coils 19 which are connected in the feedback circuit between the input and output of the amplifier 23. The coil, connected to the output of the amplifier and the capacitor 24 determine the frequency of oscillation which is generated when a tooth gap is disposed between the two coils because under these conditions energy is fed back from the output to the input of the amplifier. However, if a tooth is disposed between the two coils they are decoupled by the resultant eddy currents so that the feedback energy is insufficient for maintaining the oscillations which are thus interrupted. To ensure rapid starting of the oscillator the Q factor of the oscillator circuit must be relatively low, for example 20, a feature which is achieved by a suitable resistance circuit 25, 26, 27 connected in parallel to the oscillating circuit 19, 24. In order to compensate the temperature sensitivity of the onset of oscillation, the aforementioned resistance circuit contains the temperature-dependent resistor 27 so that the effective load resistance diminishes with an increase in temperature.

The high frequency pulses which occur at the output of the amplifier are rectified in known manner by a rectifier 28 and are converted by means of a threshold circuit 29 into neat square wave pulses which are conducted via the supply line to the measured value transmitter.

If an indication of the direction of rotation and/or an increase of the pulse frequency is desired it is possible for two electronic circuits 9 to be accommodated in the housing 1 as indicated in FIG. 1, so that the coils of the two high frequency generators are offset relative to each other by an odd multiple of a quarter tooth pitch. The outputs of the electronic circuits are supplied to a logic circuit of known kind, adapted to effect indication of the direction of rotation and/or the angular position of the shaft.

We claim:

1. An angle stepping transmitter for generating electric signals in accordance with the angular position of a shaft, comprising a high frequency generator, two coils coaxially spaced and connected in feedback relation to said high frequency generator, a bell-shaped toothed member of electrically conductive material exchangeably mounted on the shaft, said toothed member having teeth spaced by gaps, said teeth and said gaps forming a thin cylindrical wall on said bell-shaped member coaxial to said shaft and adapted to travel between said coils on rotation of the shaft and to thereby interrupt the oscillations of said high frequency generator, a U-shaped holder, means defining two coaxial cylindrical openings one in each arm of said U-shaped holder, and disposed substantially normal to said thin cylindrical wall, two pin members of electrical insulation material respectively disposed in said cylindrical openings, said coils being wound on said pin members, and means on each of said pin members defining a cylindrical portion which fits in one of said cylindrical openings for axial adjustment of the respective coil relative to said cylindrical wall, and adhesive means securing each said cylindrical portion in fixed position in the respective cylindrical opening.

2. An angle stepping transmitter as set forth in claim 1, and further comprising, a printed circuit board mounting said U-shaped holder, said high frequency generator comprising printed circuit means on said printed circuit board and being transistorized, a block encapsulating said printed circuit means, printed circuit board, U-shaped holder and said coils, and means defining a transverse slot in said block extending into the space between the arms of the U-shaped holder and between said coils, and said cylindrical wall positioned in and adapted to travel through said transverse slot on rotation of the shaft.